United States Patent
Veser et al.

[11] Patent Number: 6,116,864
[45] Date of Patent: Sep. 12, 2000

[54] MOTOR COOLING MEANS FOR A VACUUM/BLOWER DEVICE

[75] Inventors: Norbert Veser, Weinstadt; Georg Becker, Schwaikheim; Thomas Elsner, Winnenden, all of Germany

[73] Assignee: Andreas Stihl AG & Co., Germany

[21] Appl. No.: 09/007,440

[22] Filed: Jan. 15, 1998

[30] Foreign Application Priority Data

Jan. 15, 1997 [DE] Germany ............................ 197 01 082

[51] Int. Cl.[7] .................................................. F04B 17/00
[52] U.S. Cl. ........................... 417/364; 417/366; 417/368
[58] Field of Search ................................... 417/364, 366, 417/234, 368

[56] References Cited

U.S. PATENT DOCUMENTS

| 4,527,960 | 7/1985 | DeSisto | 417/368 |
| 4,918,781 | 4/1990 | Sovis et al. | 15/392 |
| 5,269,665 | 12/1993 | Sadler et al. | 417/234 |

FOREIGN PATENT DOCUMENTS

| 3125889 | 1/1983 | Germany . | |
| 3836748 | 5/1989 | Germany | 417/364 |

*Primary Examiner*—Charles G. Freay
*Assistant Examiner*—Cheryl J. Tyler
*Attorney, Agent, or Firm*—Robert W. Becker & Associates

[57] ABSTRACT

A hand-held vacuum/blower device has a housing with an interior and a drive motor arranged in the interior. The drive motor has a drive shaft. A blower spiral is connected to the housing. The blower spiral has a first and a second radial end faces and each one of the radial end faces has at least one air inlet opening. A blower wheel is arranged in the blower spiral and coupled to the drive shaft. A venting wheel is coupled to the drive shaft for conveying cooling air from the exterior of the housing to the drive motor in the interior of the housing. The blower wheel has a hub and a wall connected to the hub and extending to the periphery of the blower wheel. The wall has a first end face facing the first radial end face and a second end face facing the second radial end face. The blower wheel includes first and second vanes wherein the first vanes are connected to the first end face of the wall and the second vanes are connected to the second end face of the wall. The first radial end face is part of the housing and the air inlet opening of the first radial end face connects the interior of the housing to the suction area of the blower wheel.

7 Claims, 3 Drawing Sheets

MOTOR COOLING MEANS FOR A VACUUM/BLOWER DEVICE

BACKGROUND OF THE INVENTION

The present invention relates to a hand-held vacuum/blower device comprising a housing in which a drive motor is arranged and a blower spiral connected to the housing with a blower wheel driven by the shaft of the drive motor coupled thereto. The blower wheel comprises a hub and a wall extending to the periphery of the blower wheel whereby the wall is provided on both sides with vanes. The blower spiral has two radial end faces with at least one air inlet opening in each one of the end faces. One of the end faces is part of the housing enclosing the drive motor and the air inlet opening of this end face connects the interior of the housing to the suction area of the blower wheel.

A vacuum/blower device of the aforementioned kind is known from German patent application 38 36 748 A1. It comprises a portable housing in which an electric drive motor is received. The housing comprises a blower spiral with a blower wheel rotating therein. This blower wheel is coupled to the shaft of the drive motor and is driven by it. The blower wheel comprises a wall connected to its hub and extending in the direction toward the periphery of the blower wheel. On both sides of the wall vanes are arranged so that the blower wheel is a double flow wheel. Therefore, the blower spiral is provided with air inlet openings at both radial and faces. One of the end faces is also part of the housing surrounding the drive motor so that via the air inlet opening in this end face the interior of the housing, in which the drive motor is contained, is connected to the suction area of the blower wheel.

A blower device to be operated by hand is disclosed in German patent application 31 25 889 A1 and comprises a housing with internal combustion engine contained therein. To the housing a blower spiral is connected in which a blower wheel rotates. The blower spiral comprises an air inlet opening at one of the radial end faces whereby this air inlet opening may be provided at the end face facing the drive motor or at the opposite end face of the blower spiral. In the latter case, the air is directly entrained from the exterior of the blower wheel spiral, while, in the case of the end face facing the drive motor having the air inlet opening, the suction air is guided past the internal combustion engine in order to cool it.

It is an object of the present invention to provide a vacuum/blower device of the aforementioned kind with which in operating conditions of high heat development of the internal combustion engine an effective cooling can be provided and the drive energy can be used as efficiently as possible.

SUMMARY OF THE INVENTION

A hand-held vacuum/blower device according to the present invention is primarily characterized by:
- a housing having an interior;
- a drive motor arranged in the interior of the housing;
- the drive motor having a drive shaft;
- a blower spiral connected to the housing;
- a blower wheel arranged in the blower spiral and coupled to the drive shaft;
- the blower spiral having a first and a second radial end faces and each one of the radial end faces having at least one air inlet opening;
- a venting wheel coupled to the drive shaft for conveying cooling air from the exterior of the housing to the drive motor in the interior of the housing;
- the blower wheel having a hub and a wall connected to the hub and extending to the periphery of the blower wheel;
- the wall having a first end face facing the first radial end face and a second end face facing the second radial end face;
- the blower wheel comprising first and second vanes, wherein the first vanes are connected to the first end face of the wall and the second vanes are connected to the second end face of the wall;
- the first radial end face being a part of the housing and the at least one air inlet opening of the first radial end face connecting the interior of the housing to a suction area of the blower wheel.

The drive motor is an internal combustion engine comprising a cylinder including a cylinder head and cooling ribs. Preferably the drive shaft is a crankshaft of the drive motor and projects with the first and second and from opposed end faces of a crankcase of a drive motor. The venting wheel is fastened to the first end of crankshaft and the blower wheel is fastened to the second end of the crankshaft.

The first end of the crankshaft is conical and the venting wheel is press-fitted onto the first end.

Preferably, the wall is flat between the vanes and the wall extends perpendicularly to the axis of rotation of the blower wheel.

The air inlet opening of the first radial end face is circular.

The air inlet opening of the first radial end face is arranged within a limiting radius relative to the axis of rotation of the blower wheel, wherein the limiting radius is not more than $5/7$ of an outer radius of the blower wheel.

At the periphery of the blower wheel the first vanes have a width that is approximately ½ the width of the second vanes at the periphery.

The decisive advantage of the present invention is that the cooling air is removed by the blower wheel and in this manner is quickly conveyed through the housing. Furthermore, the hot air of the interior of the housing is not directly guided to the exterior but a large portion of fresh air is mixed into it so that a fast temperature decrease can be effected. However, it is also possible, for example, by reducing the amount of fresh air mixed into the exhaust air, to exhaust a hot or warm air stream from the blower spiral when this is required for certain operating conditions. A further decisive advantage is that the kinetic energy of the cooling air stream can be regained by guiding the cooling air stream onto the blower wheel. This causes a turbo charge effect so that the venting wheel output is partly provided as blower output of the blower wheel.

The invention is especially suitable for vacuum/blower devices in which the drive motor is an internal combustion engine provided at the cylinder head or the cylinder housing with integrally formed cooling ribs where the heat energy is transferred into the cooling air stream. Internal combustion engines have a substantially greater heat development than electrical drives so that substantially more heat energy must be removed.

The venting wheel and the blower wheel are connected fixedly to the projecting ends of the crankshaft projecting from the crankcase of the internal combustion engine. One end of the crankshaft preferably is provided with a conical end portion onto which the venting wheel is press-fitted. In this manner it is possible to provide a press-fit connection without additional components. The press-fit connection ensures the force transmission needed for driving the venting wheel and is very simple to produce.

In a preferred embodiment of the blower wheel, the wall extending between the vanes on either side is flat and extends perpendicularly to the axis of rotation of the blower wheel. In order to provide for a substantially simplified design of the housing and of the blower spiral, it is expedient to provide only one air inlet opening in the end face between the housing interior and the blower spiral whereby preferably this air inlet opening is of a circular design. Supporting of the drive shaft in the area of the end face it is not required in the inventive design. The efficiency of charging by the cooling air stream can be affected by the pressure drop. It is therefore advantageous to limit the cooling air flow within a certain radius, relative to the radius of the blower wheel, in order to supply it effectively into the vaned blower wheel. On the other hand, it must be taken into consideration that the air inlet opening must be of a sufficient size in order to avoid pressure loss when passing from the interior of the housing into the blower spiral. It is therefore expedient to arrange the air inlet opening in the end face facing the housing within a radius, that, relative to the axis of rotation of the blower wheel is maximally 5/7 of the exterior radius of the blower wheel. The ratio of the partial flows conveyed by the vanes on the respective side of the wall is also determined by the design and size of the vanes. It is therefore expedient to provide at the outer periphery of the blower wheel the vanes on the side facing the interior, respectively, the drive motor with a width that is approximately half the width of the vanes on the other side of the wall.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
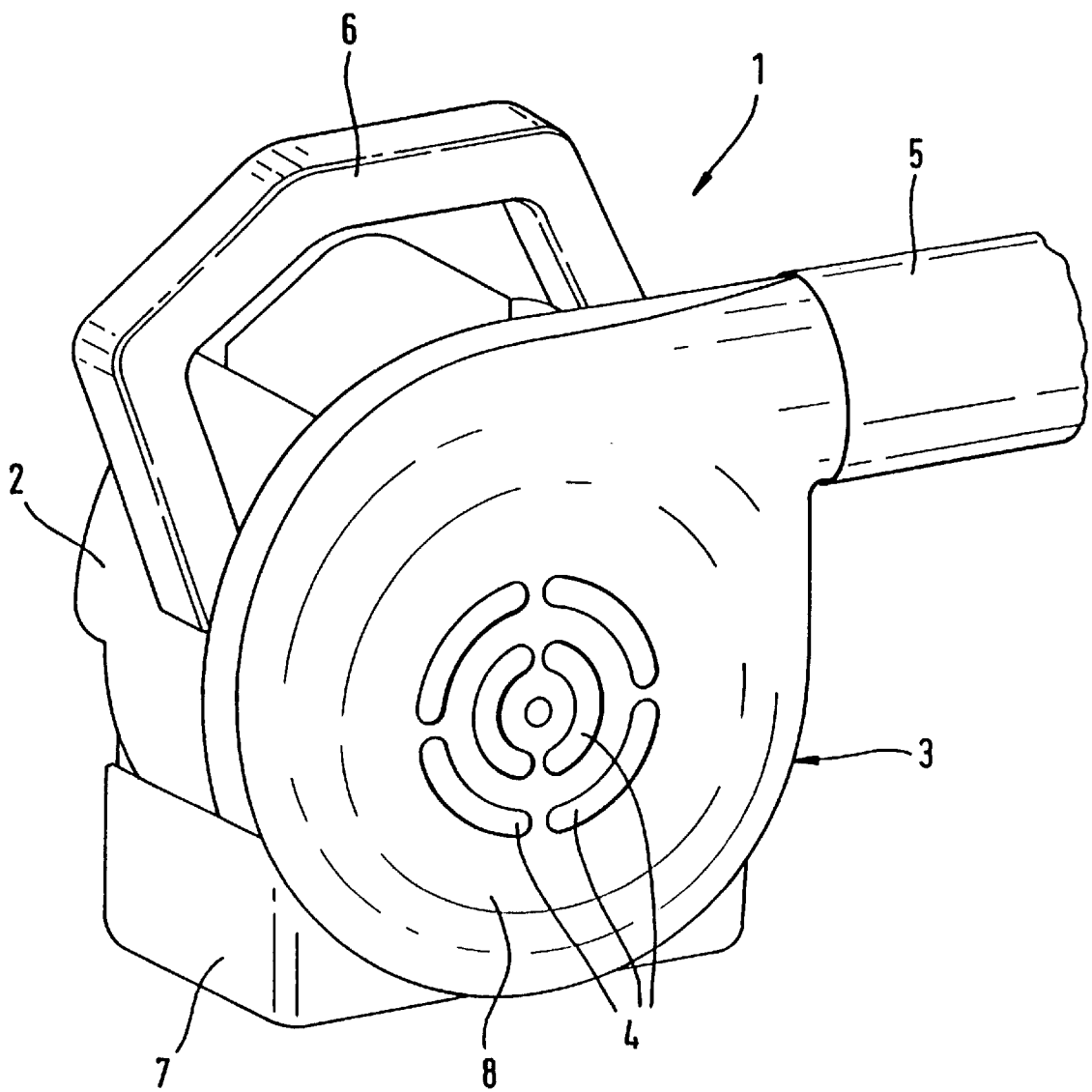
FIG. 1 is a perspective view of a vacuum/blower device with blower tube connected at the top.

FIG. 1 shows a suction/blower device 1 comprising a housing 2 with a drive motor arranged therein. The housing 2 comprises a blower spiral 3 having at its end face 8 a plurality of air inlet openings and having arranged at one end a blower tube 5. The housing 1 comprises at the top side of the housing 2 a grip 6 which serves for holding and handling the device. In the lower area of the housing 2 a support 7 is provided.

Figure 2:
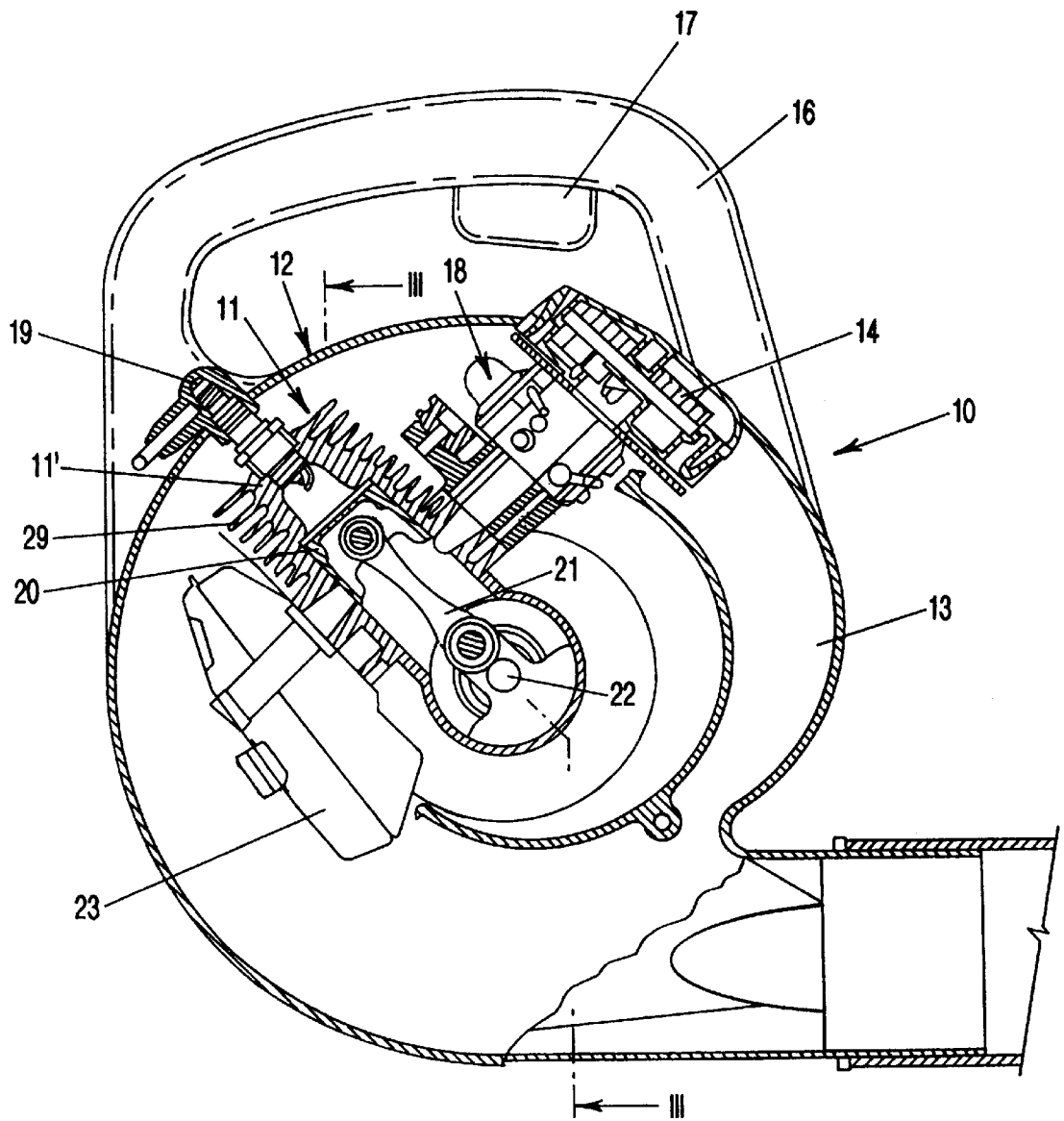
FIG. 2 is a section of a vacuum/blower device with blower tube arranged at the bottom.

FIG. 2 shows a further embodiment of a suction/blower device 10 whereby this sectional view shows the drive motor 11 and its details. In a housing 12 the internal combustion 11 is arranged which is provided with a spark plug 19. The combustion engine 11 comprises at the intake side an air filter 14 as well as a carburator 18 and at the exhaust side an exhaust gas muffler 23. In the cylinder 11" a piston 20 is longitudinally displacably guided which, via connecting rod 21, drives crankshaft 22. In the upper area of the housing 12 a grip 16 is arranged in which a gas throttle lever 17 is movably supported.

Figure 3:
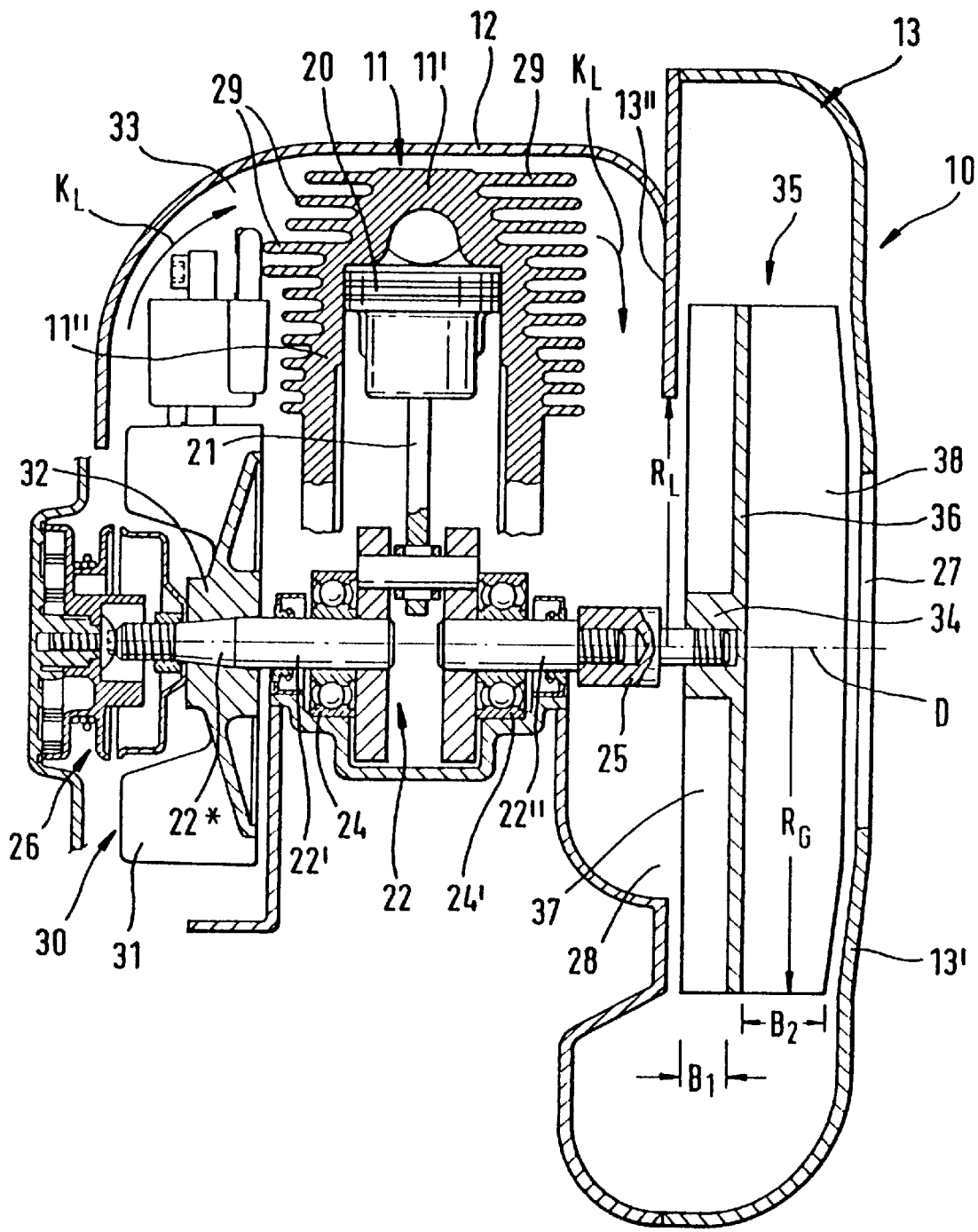
FIG. 3 is a section of the housing with drive motor and blower spiral.

FIG. 3 shows a section along the line III—III in FIG. 2. This figure shows that the drive motor 11 is arranged in the interior 33 that is delimited by the housing 12. The drive motor 11 comprises in the area of its cylinder 11" and cylinder head 11' a plurality of cooling ribs 29. The piston 20 which is guided within the cylinder 11" drives by connecting rod 21 the crank shaft 22 which is supported in roller bearings 24, 24'. On the end 22' of the crank shaft 22 a venting wheel 30 is force-lockingly (positive-lockingly) secured which can be achieved in a simple manner by press-fitting the venting wheel 30 with its hub 32 onto a conical section 22* of the crankshaft 22. Upstream of the venting wheel 30 at the end 22' of the crankshaft 22 a starter 26 is arranged. The venting wheel comprises vanes 31 for producing an air stream in the direction of arrow $K_L$ which is guided toward the cooling ribs 29 of the drive motor 11 and which receives the exhaust heat of the drive motor 11.

A blower spiral 13 is positioned laterally at the housing 12, whereby one end face 13" of the blower spiral 13 is simultaneously the border of the interior 33. Within the end face 13" an air inlet opening 28 is provided which is expediently a circular area having, relative to the axis of rotation D of the crank shaft 22, a limiting radius $R_L$. The other end face 13' of the blower spiral 13 has an air inlet opening 27 having a cross-sectional size that is slightly smaller than that of the air inlet opening 28. Within the blower spiral 13 a blower wheel 35 is arranged. With its hub 34 it is positive-lockingly secured on the connecting piece 25 and the piece 25 is connected to the end 22" of the crankshaft 22.

The blower wheel 35 has an exterior radius $R_G$ which is substantially greater than the limiting radius $R_L$ of the air inlet opening 28. In the shown embodiment, a ratio $R_L$ to $R_G$ of 5:7 is provided. The blower wheel 35 comprises a flat wall 36 extending in the radial direction to the periphery of the blower wheel 35. The wall 36 extends perpendicularly to the axis of rotation D. On the end face of the wall 36 facing the interior 33 or the drive motor 11, the blower wheel 35 has an arrangement of a plurality of vanes 37 so that an air stream in the radial direction is produced. At the opposite end face of the wall 36 an arrangement of vanes 38 is provided with which a further air stream in the radial direction can be produced. While, on the one hand, exterior air is sucked in through the air inlet opening 27 and a blower air stream is generated, the side of the blower wheel 35 facing the interior 33 removes air from the interior 33 through the air inlet opening 28. In this manner the cooling air stream $K_L$ can enter the suction area of the blower wheel 35 whereby the kinetic energy of the cooling air stream is used in that the vanes 37 accelerate this air stream and, together with the air stream produced by the vanes 38, introduce it into the blower tube. Depending on the dimensions of the vanes and/or the air inlet openings, the ratio of generated partial air streams can be determined. In the shown embodiment, the width $B_1$ of the vanes 37 at the periphery of the blower wheel 35 is approximately half the width $B_2$ of the vanes 38.

The specification incorporates by reference the disclosure of German priority document 197 01 082.2 of Jan. 15 1997.

The present invention is, of course, in no way restricted to the specific disclosure of the specification and drawings, but also encompasses any modifications within the scope of the appended claims.

What is claimed is:

1. A hand-held vacuum/blower device comprising:

a housing having an interior;

a drive motor arranged in said interior of said housing;

said drive motor having a drive shaft;

a blower spiral connected to said housing;

a blower wheel arranged in said blower spiral and coupled to said drive shaft;

a blower spiral having a first and a second radial end faces and each one of said radial end faces having at least one air inlet opening, said at least one air inlet opening being 5/7 the size of said blower wheel and passing a cooling air through said at least one air inlet opening;

a venting wheel coupled to said drive shaft for conveying substantially all of the cooling air from the exterior of said housing to said drive motor in said interior of said housing;

said blower wheel having a hub and a wall connected to said hub and extending to a periphery of said blower wheel;

said wall having a first end face facing said first radial end face and a second end face facing said second radial end face;

said blower wheel comprising first and second vanes, wherein said first vanes are connected to said first end face of said wall and said second vanes are connected to said second end face of said wall;

said first radial end face being a part of said housing and said at least one air inlet opening of said first radial end face connecting said interior of said housing to a suction area of said blower wheel, wherein said first vanes are configured to convey substantially all of the cooling air, after having flown past said drive motor for cooling, from said interior into said blower spiral where the cooling air is mixed with the working air stream generated by the blower wheel.

2. A vacuum/blower device according to claim 1, wherein said drive motor is an internal combustion engine comprising a cylinder including a cylinder head and cooling ribs.

3. A vacuum/blower device according to claim 2, wherein said drive shaft is a crank shaft of said drive motor and projects with a first and a second end from opposed end faces of a crank case of said drive motor, wherein said venting wheel is fastened to said first end of said crankshaft and said blower wheel is fastened to said second end of said crankshaft.

4. A vacuum/blower device according to claim 3, wherein said first end of said crankshaft is conical and wherein said venting wheel is press-fitted onto said first end.

5. A vacuum/blower device according to claim 1, wherein said wall is flat between said vanes and wherein said wall extends perpendicularly to an axis of rotation of said blower wheel.

6. A vacuum/blower device according to claim 1, wherein said air inlet opening of said first radial end face is circular.

7. A vacuum/blower device according to claim 1, wherein at said periphery of said blower wheel said first vanes have a width that is approximately one half the width of said second vanes at said periphery.

* * * * *